Figure 1:
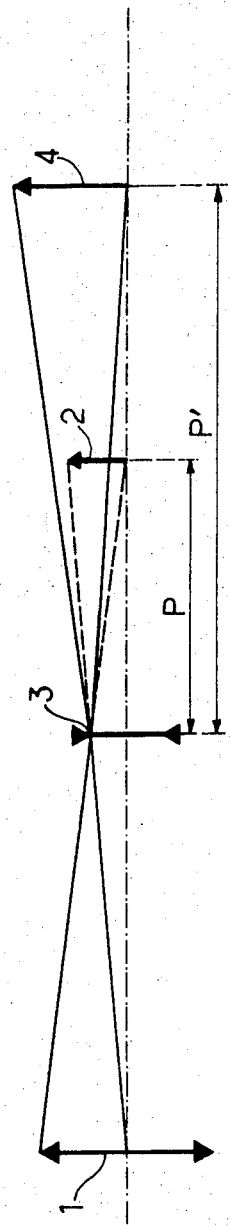

United States Patent

Clave et al.

[15] 3,645,602
[45] Feb. 29, 1972

[54] COMPACT OPTICAL SYSTEM PERMITTING AN INSTANTANEOUS INCREASE IN MAGNIFICATION WITHOUT REFOCUSSING

[72] Inventors: Serge Clave;; Marcel Clave, both of 9 Rue Olivier-metra, Paris, France

[22] Filed: May 8, 1970

[21] Appl. No.: 35,774

[30] Foreign Application Priority Data

May 21, 1969  France..................................6916575

[52] U.S. Cl....................................350/36, 350/38, 350/48, 350/183
[51] Int. Cl.................G02b 21/20, G02b 7/04, G02b 15/00
[58] Field of Search......................................350/36–38, 183, 350/48–53

[56] References Cited

UNITED STATES PATENTS 1,798,396  3/1931  Bauersfeld et al. ...................350/36 X
1,843,439  2/1932  Bauersfeld et al.................350/36 UX Primary Examiner—David Schonberg
Assistant Examiner—Toby H. Kusmer
Attorney—Holcombe, Wetherill & Brisebois

[57] ABSTRACT

Optical system comprising a Barlow amplifier and adapted to make it possible to change the magnification of an image formed by an objective without displacing the image by varying the length of the optical path travelled in dependence upon the enlargement of said image. This optical device is characterized by the fact that it comprises an assembly of reflecting plane surfaces some of which are pivotally mounted so as to permit an increase in the number of reflections undergone by said rays at the same time as said magnification. The device is particularly applicable to telescopes and to binoculars, which may be provided with means for increasing their stereoscopic effect.

14 Claims, 17 Drawing Figures

Patented Feb. 29, 1972 3,645,602

6 Sheets-Sheet 1

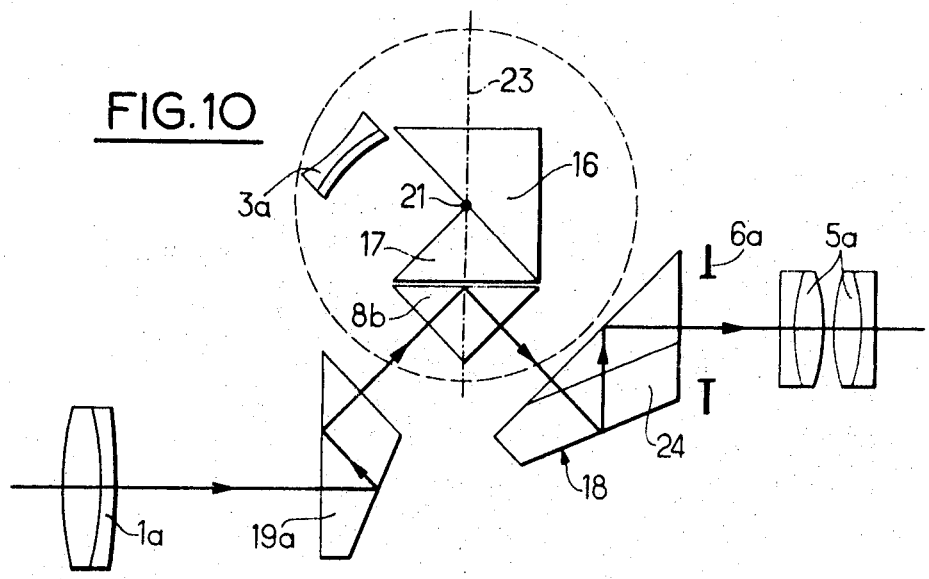
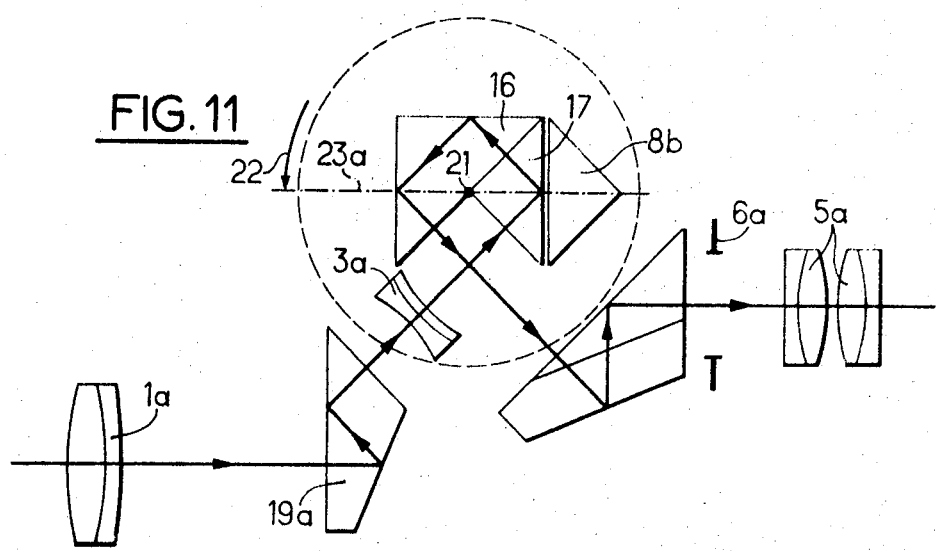

COMPACT OPTICAL SYSTEM PERMITTING AN INSTANTANEOUS INCREASE IN MAGNIFICATION WITHOUT REFOCUSSING

SUMMARY OF THE INVENTION

It is conventional to change the magnification of an optical system by inserting an element of negative power known as a Barlow amplifier, which may comprise several individual lens members.

Such an optical element is positioned between the objective of the optical system and the image formed by this objective at a distance co + P, and makes it possible to obtain an enlarged image at a distance P' such that the ratio P'/P is equal to the desired coefficient of magnification.

This change in the magnification necessarily leads to a displacement of the position of an image by a distance equal to the difference between the two distances P' and P, and this displacement must be followed by refocusing so that the new image can be accurately observed.

Moreover, the insertion of the element of negative power results in a substantial increase in the bulk of the system which must be generally taken apart to remove it.

It is the object of the present invention to provide optical systems which are capable of overcoming these disadvantages so that it is unnecessary to displace the image or refocus the system, regardless of the magnification selected. The invention also avoids any need to take the system apart to remove the Barlow amplifier, without thereby substantially increasing the bulk of the optical system.

These results are obtained in accordance with the invention by using two different optical paths produced by swinging or pivotally mounted prisms or mirrors. The length of these paths make it possible to obtain with a single objective an image of invariable position, with and without the Barlow amplifier.

When such an amplifier is associated with such a combination of swinging and pivotal prisms or mirrors, an image may be observed at two different magnifications without having to change its position and the focus, by using relatively compact optical combinations.

Of course, such a device may be used in combination with other systems incorporating prisms so as to obtain simultaneously the re-erection of the image and the possibility of varying the magnification produced by the Barlow amplifier.

Figure 3:
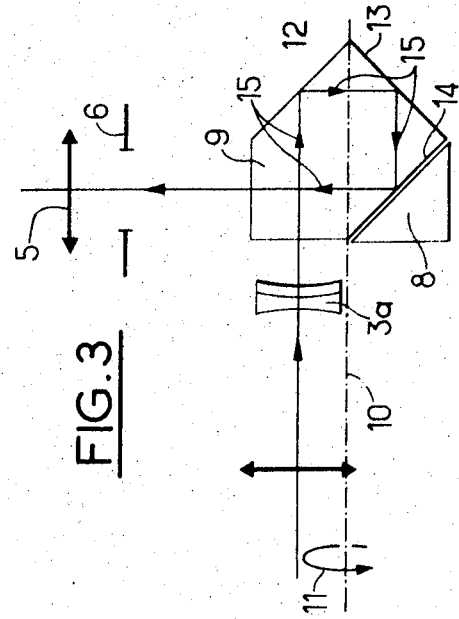
Figure 2:
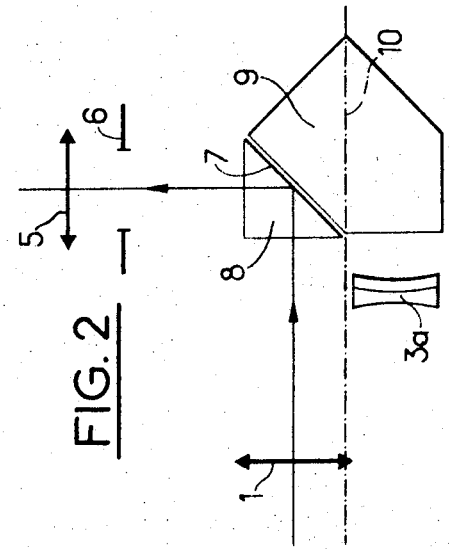
Figure 4:
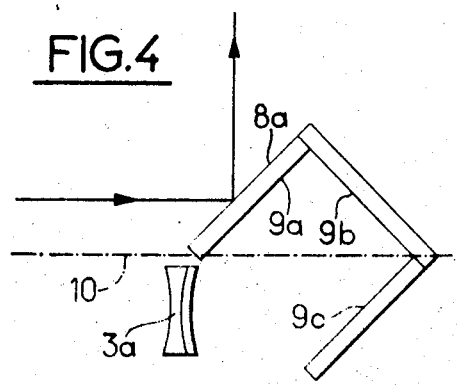
Figure 5:
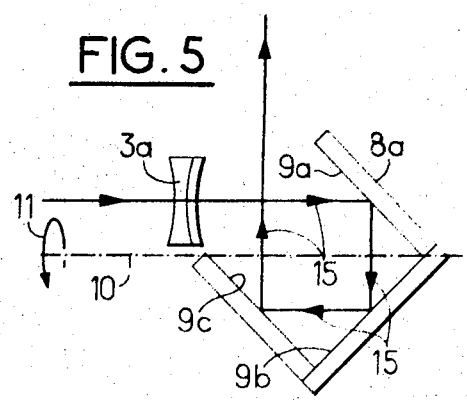
Figure 6:
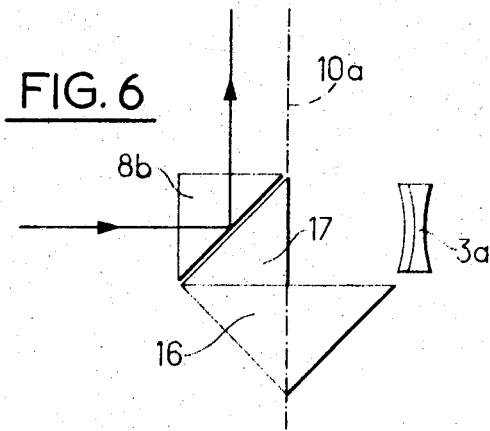
Figure 7:
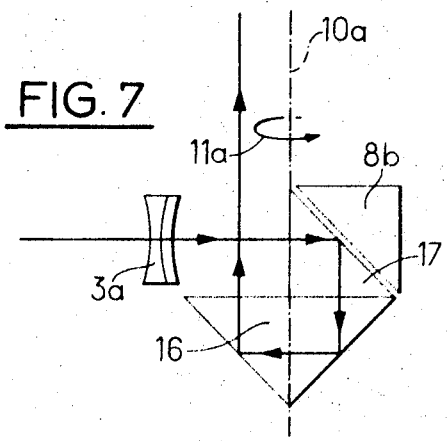
Figure 8:
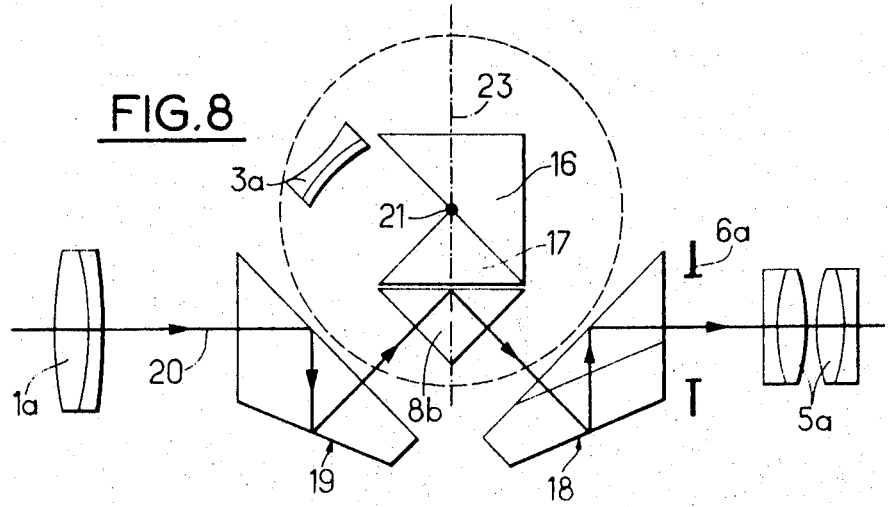
Figure 9:
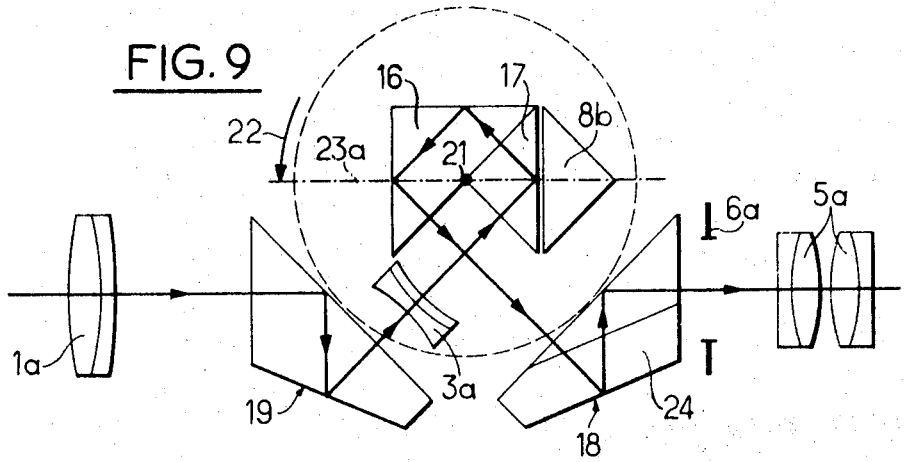
Figure 12:
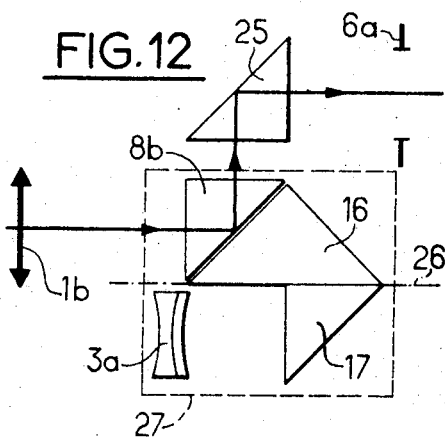
Figure 13:
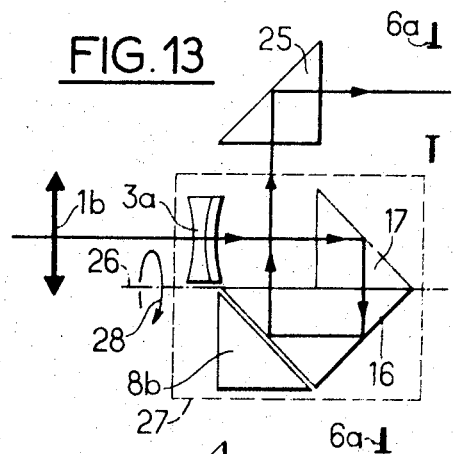

The characteristics of the present invention will be better understood from a reading of the following description of several embodiments of the invention, given purely by way of example, with reference to the accompanying drawings on which:

FIG. 1 is a schematic representation of a conventional system using a Barlow amplifier;

FIGS. 2 and 3 schematically illustrate the operation of a device according to the invention with and without the Barlow amplifier;

FIGS. 4 and 5 schematically illustrate similar systems embodying the device according to the invention when that device consists solely of mirrors, with FIG. 4 showing the path of travel of the light rays which do not pass through the Barlow amplifier and FIG. 5 the path travelled by those light rays which do pass through the Barlow amplifier;

FIGS. 6 and 7 both show another embodiment of the invention combining the use of a totally reflective prism having a single surface of reflection with a combination of two adjoining totally reflective prisms, which produce a total of three reflections;

FIGS. 8 and 9 represent the adaptation of the latter combination to binoculars providing a re-erected image and two interchangeable magnifications;

FIGS. 10 and 11 schematically illustrate an alternative embodiment of the binoculars of the type shown on FIGS. 8 and 9 which permit the optical axis of the objective and that of the eyepiece to be spaced one from the other so as to obtain an accentuated stereoscopic effect and also reduce the dimensions of one of the prisms used to separate the light rays by 45°;

FIGS. 12 and 13 represent another embodiment of the invention applicable to a photographic objective or to a sighting device for the eyepiece of telescopes; and FIGS. 14 to 17 show devices in which the optical path passing through the Barlow amplifier undergoes five reflections, whereas the light which does not pass through the Barlow amplifier is reflected only once by the totally reflecting surface of the prism.

FIG. 1 shows the objective 1 which forms an image 2 of an object situated on the other side of the objective, in a normal manner. The insertion of the Barlow amplifier 3 which, as has been indicated above, may comprise a plurality of associated lens members, between the objective 1 and the image 2, creates an enlarged image 4 at a distance P' from the Barlow amplifier which is greater than the distance P separating the image 2 from this amplifier. The ratio P'/P represents the coefficient of magnification of this optical element of negative power.

However, when an eyepiece used to observe the image 2 formed by the objective 1, it is no longer in focus to observe the enlarged image 4 and must be displaced toward the right by a distance equal to the distance P'−P, so as to be brought to the same distance from the enlarged image 4 as that which separated it from the image 2.

Referring now to FIGS. 2 and 3, it will be seen that the objective 1 of FIG. 2 forms an image in the plane of the diaphragm 6 at a predetermined distance from an eyepiece 5, after reflection from the surface 7 of a totally reflective prism 8. In this case the light rays do not pass through the Barlow amplifier 3a.

On the contrary, if the assembly 3a is turned through 180° and the two prisms 8 and 9 shown on FIGS. 2 and 3 are turned about the axis 10 shown in chain lines on these figures, for example in the direction of the arrow 11 shown on FIG. 3, the light rays which converge to form the image at the same place, that is to say at the plane of the diaphragm 6, travel along a different path and are reflected three times from the surface 12, 13, and 14 of the prism 9 instead of being reflected from the surface 7 of the prism 8 as in the case of FIG. 2.

The difference P'−P between the length of the optical paths travelled with or without insertion of the Barlow amplifier 3a represents a path travelled in glass, and allowing for the index of refraction of the glass, this difference, the value of which varies in dependence on the position and the coefficient of magnification of the Barlow amplifier, is equal, for an axial ray, to the quotient for this index of refraction of the sum of the length of the four sides of a square carrying the arrows 15 shown on FIG. 3.

It will also be noted that, in this embodiment, the Barlow amplifier turns at the same time as the prisms 8 and 9 and retains a constant position relative to these prisms.

Turning now to FIGS. 4 and 5, it will be seen that the totally reflective prism 8 has been replaced by a metallized external reflecting surface 8a and that the prism 9 having three reflective surfaces has been replaced by three metallized internal reflecting surfaces 9a, 9b, 9c. The rotation of the Barlow amplifier 3a and the three mirrors supporting the reflecting surfaces takes place in the same manner as in the case of FIGS. 2 and 3 by rotation through 180° about the axis 10 shown in plain lines, in the direction of the arrow 11 shown in FIG. 5 or in the opposite direction. However, in this case, the optical path travelled is entirely in air.

The device shown in FIGS. 6 and 7 uses a prism 8b comprising a totally reflective surface and a pair of adjoining prisms 16, 17 comprising three totally reflecting surfaces.

In this embodiment of the invention the difference in length between the optical paths corresponds to a path in air equal to the sum of the two sides of a square similar to those of the preceding embodiments and to a path of the same length in glass, but the Barlow amplifier is inserted by rotating it through 180° about an axis 10a perpendicular to the optical axis of the amplifier in the direction of the arrow 11a of FIG. 7, or in the opposite direction.

The combination of totally reflective prisms shown on FIGS. 8 and 9 does not differ substantially from those shown on FIGS. 6 and 7.

However, in the application to binoculars which is illustrated by these figures, two symmetrical prisms 18 and 19 are used in a conventional manner to provide by double reflection a 45° separation between the light rays which pass therethrough so as to produce without the Barlow amplifier light rays which propagate along the optical path shown at 20 in FIG. 8.

In this embodiment, the Barlow amplifier is inserted by rotating it 90° about an axis 21 perpendicular to the plane of the drawing in the direction of the arrow 22 of FIG. 9, which brings the axis 23 to the position 23a shown in broken lines on FIG. 8.

It is easy to understand that, in the case of binoculars, the device necessarily comprises for the other eye, two other prisms which are symmetrical to the prisms 18 and 19 and an optical combination which is symmetrical to the prisms 8b, 16 and 17.

It should be further noted that, in order to obtain complete re-erection of the image, the prism 18 preferably comprises a lower surface 24 which is shaped like a roof.

The embodiment of FIGS. 10 and 11 differs from that of FIGS. 8 and 9 only in the fact that the prism 19 is replaced by a smaller prism 19a, which is oriented in a different direction and makes it possible to obtain a separation between the optical axis of the objective 1 and that of the eyepiece 5a, the image always being formed in the plane of the diaphragm 6a shown on FIGS. 8 to 11.

In the case of the binoculars the distance between the objectives is thus increased as compared with that between the two eyepieces, so as to make it possible to obtain an accentuated stereoscopic effect.

FIGS. 12 and 13 show an adaptation of the same device to a photographic objective, or to a sight for spy glasses and telescopes.

This optical system comprises a supplemental totally reflective prism mounted in a stationary manner with respect to the objective 1b. The image, whether magnified or not, is always formed in the plane of the diaphragm 6a.

In this case the device is rotated through 180° about an axis 26 shown in broken lines on FIGS. 12 and 13, the Barlow amplifier being mounted in a fixed position with respect to the prisms 8b, 16 and 17.

FIGS. 12 and 13 show in broken lines a mounting 27 carrying both the Barlow amplifier and said prisms, the rotation taking place, for example, in the direction of the arrow 28 shown in FIG. 13.

Figure 14:
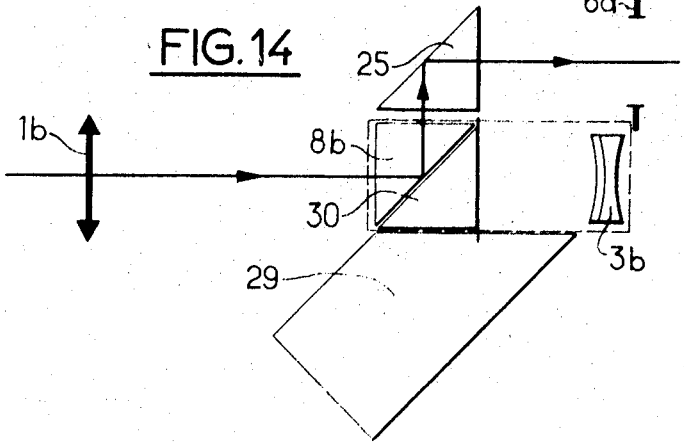
Figure 15:
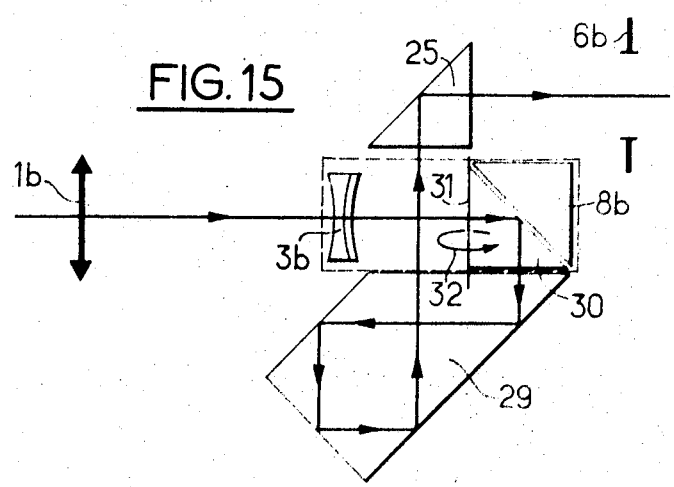

In the embodiment of FIGS. 14 and 15 a prism having five reflecting surfaces is used, which is formed by juxtaposing a fixed prism 29 to a pivotally mounted prism 30 and a second pivotally mounted prism 8b having a single totally reflecting surface. These prisms are associated with a second fixed prism 25.

By turning the two prisms 8b and 30, as well as the Barlow amplifier 3b, through 180° about an axis 31 in the direction indicated by the arrow 32 shown on FIG. 15, the Barlow amplifier 3b is inserted in the optical path shown on FIG. 15 whereas in FIG. 14, in which only the totally reflective surfaces of the prisms 8b, and 25 are used, it lies outside the optical path.

It will be appreciated that the difference between the lengths of the optical paths is, in this case, greatly increased, particularly in the glass, where the path travelled is already multiplied by a ratio of the order of 1 to 6. A complementary path in air also exists after insertion of the Barlow amplifier, which path is already substantially twice as long as the path in the glass in the absence of an amplifier, the coefficient of magnification of which is thus substantially increased.

In these two cases of FIGS. 14 and 15 the image, whether magnified or not, is always formed in the plane of the diaphragm 6a.

Figure 16:
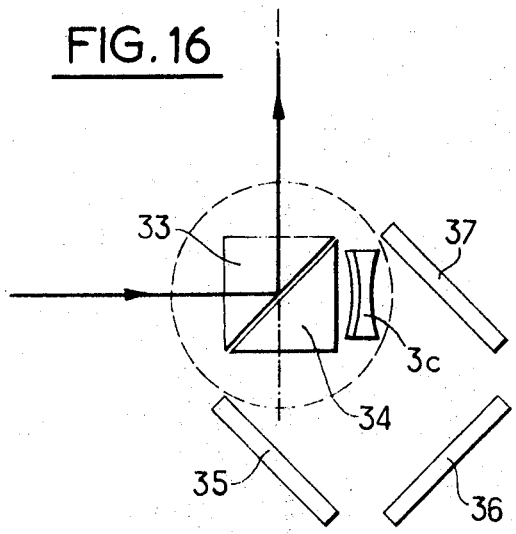
Figure 17:
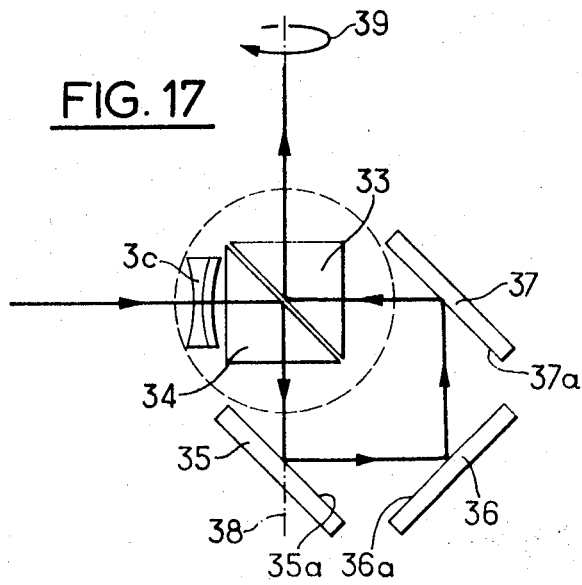

Referring now to FIGS. 16 and 17, which illustrate a device in which the optical path travelled without passing through a Barlow amplifier is reflected only once by a totally reflecting prism, whereas the optical path which passes through the Barlow amplifier is twice totally reflected from the surfaces of two similar facing prisms and three times reflected from other mirrors, it will be seen that the difference in the optical paths corresponds partially to an additional path in the glass substantially equal to one side of the square like that of the embodiments preceding, and partially to an additional path in air, the length of which is of the order of the sum of three sides of a square of slightly larger dimensions.

Reference numerals 33 and 34 indicate the two totally reflecting prisms which are joined together and 3c indicates the Barlow magnifier, the three mirrors of the device carrying respectively reference numerals 35, 36, 37.

These three mirrors are fixed, whereas the assembly comprising the two prisms 33 and 34 and the Barlow amplifier 3c are rotatable through 180° about an axis 38 in the direction of the arrow 39 shown in FIG. 17, or in the opposite direction.

FIG. 16 shows that the optical path in glass, in the absence of the Barlow amplifier, corresponds substantially to one of the sides of the square formed by the prisms 33 and 34 whereas FIG. 17 shows that the optical path travelled in the glass beyond the Barlow amplifier corresponds substantially to a double path.

Moreover, in the case of FIG. 17, the optical path also comprises a notable distance in air between the prism 34 and the prism 33, which distance involves three reflections on the metallized surfaces 35a, 36a, 37a of the mirrors 35, 36, 37.

It will of course be understood that the embodiments which have just been described may be modified as to detail without thereby departing from the basic principles of the invention as defined by the following claims.

In particular, the reflecting surfaces may be oriented at different angles relative to the incident rays which are multiples of 45°.

It is also possible to eliminate the prisms 8 and 8b shown on FIGS. 2, 3 and 6–15 by replacing the totally reflective surface of these prisms by an external metallized surface lying in the same direction, formed on one of prisms 9, 16, 17 or 30, the difference between the optical paths being in this case somewhat modified by the replacement of the part of these optical paths in the glass of prisms 8 or 8b by a similar path in air.

What is claimed is:

1. In an optical system comprising an eyepiece, an objective, reflecting members defining an optical path traversed by light rays passing from said objective to said eyepiece, and image amplifying means mounted to be inserted into or withdrawn from said path in order to modify the size of an image formed by said objective and thereby increase the distance between said objective and the plane of said image, the improvement according to which said amplifying means and at least one reflecting member is mounted to pivot about an appropriate axis so as to maintain an optical path between said objective and said eyepiece regardless of whether said amplifying means is inserted in said path, but increase the length of said path when said amplifying means is inserted therein by a distance equal to the increase in the distance between said objective and said image plane resulting from said insertion.

2. Device as claimed in clam 1 in which an axial ray from said objective is reflected at an angle of 45° from each reflecting surface of a reflecting member.

3. Optical device as claimed in claim 2 in which said reflecting members include two prisms having one and three totally reflective surfaces respectively, one of said prisms being mounted to be inserted in said optical path when said amplifier is inserted therein, and the other when said amplifier is retracted, the assembly of said amplifier and said prisms being pivotally mounted on an axis parallel to the path of travel of an axial light ray leaving said objective.

4. Device as claimed in claim 2 in which said reflecting members comprise three mirrors each perpendicular to the preceding mirror, one of which mirrors has both an internal surface and an external surface which are metallized and reflecting, whereas the other two mirrors have only an internal metallized reflecting surface.

5. Optical device as claimed in claim 1 in which said reflecting members comprise an assembly of two prisms fixed to each other and having totally reflecting surfaces forming three-quarters of a square in section, and an independent prism having a section in the form of an isosceles triangle and a single reflecting surface, said prisms being mounted for rotation about an axis perpendicular to the direction of an axial ray from said objective between a position occupied when said amplifier is inserted in said path and in which said totally reflective surfaces are also inserted in said path, and a position occupied when said amplifier is withdrawn from said path in which only the single reflecting surface of the independent prism is inserted in said path.

6. An optical system as claimed in claim 5 positioned in the path of travel of light rays reaching the eyepiece of a telescope and between two double-reflecting prisms, each of which deviates incident rays through an angle of 45°, said assembly being mounted to rotate about an axis perpendicular to the axis of said eyepiece and said objective.

7. A pair of optical systems as claimed in claim 6 mounted to form binoculars and in which each double-reflecting prism which produces a deviation of 45° in the light rays between each objective and the corresponding rotatably mounted assembly is positioned with its largest face perpendicular to the direction of the incident axial ray from said objective and is smaller than the other double-reflecting prism associated with that assembly so as to increase the axial separation between the two objectives of said binoculars with respect to that between the two eyepieces of said binoculars and thereby increase its stereoscopic effect.

8. System as claimed in claim 5, in which said three prisms are mounted to rotate about an axis parallel to an axial ray leaving said objective.

9. System as claimed in claim 2 comprising three juxtaposed prisms, two of which have a single totally reflecting surface and are mounted to turn with said amplifier, about an axis perpendicular to the direction of an axial ray from said objective, while the third prism is stationary and comprises three totally reflecting surfaced producing four successive reflections of said light rays when said amplifier is inserted in the path of travel of said rays, the other two prisms being inserted in said path only when said amplifier is withdrawn from said path.

10. Device as claimed in claim 2 in which said reflecting members consist of a mirror having a single reflective surface and a prism having three reflecting surfaces, one of said reflecting members being mounted to lie in said optical path when said amplifier is inserted therein, and the other when said amplifier is retracted, the assembly of said reflecting members being pivotally mounted to turn about an axis parallel to the path of travel of an axial light ray leaving said objective.

11. Device as claimed in claim 2 in which said reflecting members comprise an assembly of two independent prisms, each having a section in the shape of a right isosceles triangle and each having a single totally reflecting surface, juxtaposed with respect to each other along the hypotenuse of said triangle and pivotally mounted about an axis perpendicular to an axial ray from said objective, and three stationary mirrors positioned along three contiguous sides of a rectangle which are provided with metallized internal faces, whereby light rays travelling along said path undergo five reflections when said amplifier is inserted therein, three of which are at said metallized internal surfaces and two of which are at the totally reflecting surfaces of the two said prisms.

12. Device as claimed in claim 12 in which said amplifying means is a Barlow amplifier.

13. Device as claimed in claim 12 in which said reflecting means rotates to increase the number of reflective surfaces along said optical path by an even number when said amplifying means is inserted in said path.

14. Device as claimed in claim 1 in which said rotating reflecting member has at least one surface in said optical path regardless of whether said amplifying means is in said path or not, and said additional reflecting surfaces are formed on said reflecting means.

* * * * *